(12) United States Patent
Chaise (10) Patent No.: US 11,204,021 B2
(45) Date of Patent: Dec. 21, 2021

(54) HYDROGEN COMPRESSOR WITH METAL HYDRIDE

(71) Applicant: COMMISSARIAT A L'ENERGIE ATOMIQUE ET AUX ENERGIES ALTERNATIVES, Paris (FR)

(72) Inventor: Albin Chaise, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 276 days.

(21) Appl. No.: 16/334,523

(22) PCT Filed: Sep. 19, 2017

(86) PCT No.: PCT/FR2017/052502
§ 371 (c)(1),
(2) Date: Mar. 19, 2019

(87) PCT Pub. No.: WO2018/055277
PCT Pub. Date: Mar. 29, 2018

(65) Prior Publication Data
US 2020/0332783 A1  Oct. 22, 2020

(30) Foreign Application Priority Data

Sep. 21, 2016 (FR) .................................... 16 58853

(51) Int. Cl.
*F17C 11/00* (2006.01)
*F04B 19/24* (2006.01)
(Continued)

(52) U.S. Cl.
CPC ............ *F04B 19/24* (2013.01); *C01B 3/0031* (2013.01); *C01B 3/0036* (2013.01);
(Continued)

(58) Field of Classification Search
CPC ... C01B 3/0031; C01B 3/0036; C01B 3/0068; F17C 11/00; F17C 2221/012;
(Continued)

(56) References Cited

U.S. PATENT DOCUMENTS 4,609,038 A * 9/1986 Ishikawa ............... C01B 3/0005
165/104.12
4,964,524 A * 10/1990 Halene .................. F17C 11/005
220/586

(Continued)

FOREIGN PATENT DOCUMENTS

FR  2 924 787 A1  6/2009
FR  2 950 045 A1  3/2011
(Continued)

OTHER PUBLICATIONS

International Search Report dated Dec. 15, 2017 in PCT/FR2017/052502 filed on Sep. 19, 2017.
(Continued)

*Primary Examiner* — Frank M Lawrence, Jr.
(74) *Attorney, Agent, or Firm* — Oblon, McClelland, Maier & Neustadt, L.L.P.

(57) ABSTRACT

The invention relates to a hydrogen compressor with metal hydride comprising: a pressure chamber, comprising an inner space, defined by a first inner surface; a shell with a thickness E, the shell comprising a first outer surface facing the first inner surface, the shell comprising an insulating material with first thermal conductivity; and a hydrogen storage element, contained in the shell, comprising a storage material suitable for storing or releasing hydrogen as a function of a temperature that is imposed on same, and having a second thermal conductivity higher than the first thermal conductivity.

15 Claims, 4 Drawing Sheets

(51) Int. Cl.
*C01B 3/00* (2006.01)
*F04B 15/08* (2006.01)
*F04B 37/04* (2006.01)
*F04B 37/18* (2006.01)
*F17C 5/06* (2006.01)
*F04B 37/12* (2006.01)

(52) U.S. Cl.
CPC ............ *C01B 3/0068* (2013.01); *F04B 15/08* (2013.01); *F04B 37/04* (2013.01); *F04B 37/12* (2013.01); *F04B 37/18* (2013.01); *F17C 5/06* (2013.01); *F17C 11/005* (2013.01); *F04B 2015/0822* (2013.01); *F17C 2221/012* (2013.01); *F17C 2227/0157* (2013.01)

(58) Field of Classification Search
CPC .... F17C 2227/0657; F17C 5/06; F04B 15/08; F04B 19/24; F04B 2015/0822; F04B 37/04; F04B 37/12; F04B 37/18; Y02E 60/32
USPC .................. 206/0.7; 96/108, 146; 423/658.2; 429/515
See application file for complete search history.

(56) References Cited

U.S. PATENT DOCUMENTS

| | | | | |
|---|---|---|---|---|
| 5,895,519 | A | * | 4/1999 | Lorimer ............... B01D 53/229 95/56 |
| 6,015,041 | A | * | 1/2000 | Heung .................. F17C 11/005 206/70 |
| 2008/0302246 | A1 | * | 12/2008 | Carruthers ............... B01J 20/20 96/154 |
| 2010/0257873 | A1 | * | 10/2010 | Mueller ................ F17C 11/005 62/46.1 |
| 2010/0326992 | A1 | | 12/2010 | De Rango et al. |
| 2011/0127174 | A1 | * | 6/2011 | Heinrich ............... C01B 3/0005 206/0.7 |
| 2011/0303175 | A1 | | 12/2011 | Hopkins |
| 2012/0201719 | A1 | | 8/2012 | Jehan et al. |
| 2014/0363346 | A1 | | 12/2014 | Pigeon |

FOREIGN PATENT DOCUMENTS

| | | | |
|---|---|---|---|
| JP | 2001-304495 | * | 10/2001 |
| JP | 2002-364943 | | 12/2002 |
| JP | 2011-508855 | | 3/2011 |
| JP | 2013-505405 | | 2/2013 |
| JP | 2014-080329 | | 5/2014 |
| WO | WO 2012/114229 A1 | | 8/2012 |

OTHER PUBLICATIONS

French Preliminary Search Report dated Jun. 2, 2017 in French Application 16 58853 filed on Sep. 21, 2016.
U.S. Appl. No. 15/106,063, filed Jun. 17, 2016, US 2016/0312956 A1, Albin Chaise et al.
U.S. Appl. No. 15/536,753, filed Jun. 16, 2017, US 2018/0003345 A1, Olivier Gillia et al.
Office Action dated Sep. 6, 2021, in JP patent application No. 2019-515574, English translation only—5 pages.

* cited by examiner

FIG.1

PRIOR ART

HYDROGEN COMPRESSOR WITH METAL HYDRIDE

TECHNICAL FIELD

The present invention relates to a hydrogen compressor, more particularly a metal hydride hydrogen compressor suitable for delivering hydrogen at high pressures, for example pressures above 100 bar.

PRIOR ART

Figure 1:
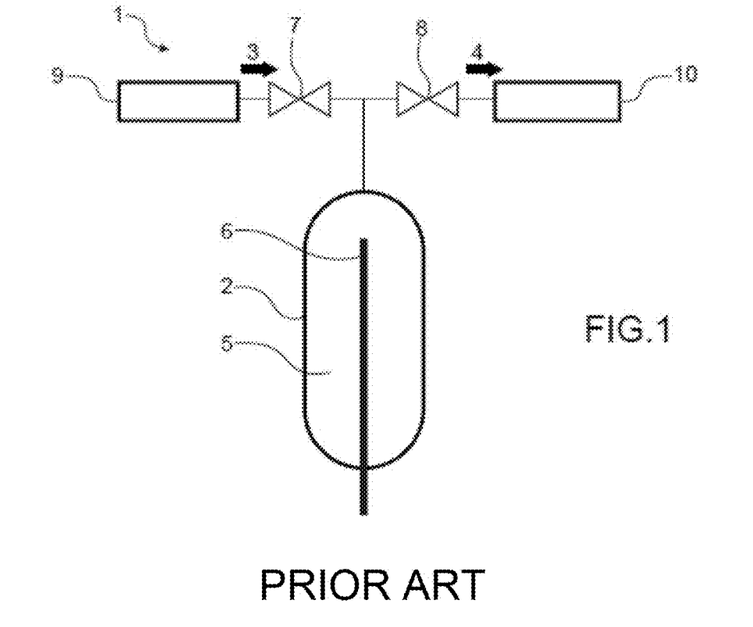
FIG. 1 is a schematic representation of a metal hydride compressor known from the prior art.

FIG. 1 presents a metal hydride hydrogen compressor 1 known from the prior art and described in document [1] cited at the end of the application.

This compressor 1 comprises:
- a pressure chamber 2 comprising an internal surface,
- a hydrogen supply 3,
- a hydrogen discharge 4,
- a hydrogen storage element 5 suitable for storing or releasing hydrogen according to a temperature that is imposed thereon, the storage element 5 comprising a storage material,
- a heat exchange means 6.

Such a compressor 1 allows the compression of gaseous hydrogen without recourse to a mechanical system involving the movement of movable parts.

More particularly, the operating principle of the metal hydrogen compressor is based on a reversible absorption of hydrogen by a storage material on which cooling and heating thermal cycles are imposed.

The storage material in general comprises a metal species.

The heat exchange means 6 intended to exchange heat with the storage material generally comprises a metal tube through which a heat-transfer fluid travels.

The metal hydride hydrogen compressor 1 can be supplied, via a supply pipe provided with a supply valve 7, by a low-pressure hydrogen source 9.

The hydrogen compressor 1 may also be connected, via a transfer pipe provided with a transfer valve 8, to a reservoir 10.

By way of example, FIGS. 2a-2d illustrate the operating principle, in four steps, of the metal hydride hydrogen compressor 1.

During the first step (FIG. 2a), the pressure chamber, comprising the storage element 5, is put in communication with the low-pressure hydrogen source (for example a pressure of between 0.02 bar and 270 bar) by opening the supply valve 7. During this same step, the storage element 5 is cooled by the heat exchange means 6 to a temperature that may be between −100° C. and 50° C. Thus, since it is cooled, the storage element 5 absorbs the hydrogen.

The second step (FIG. 2b) begins with the isolation of the pressure chamber from the hydrogen source by closing the supply valve 7.

Figure 2A:
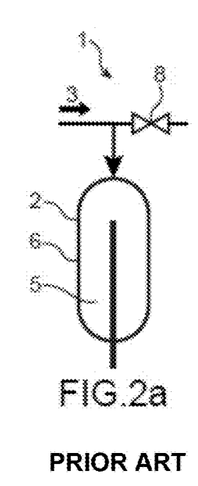
FIGS. 2a to 2d are schematic representations of the four operating steps of a metal hydride compressor.
Figure 2B:
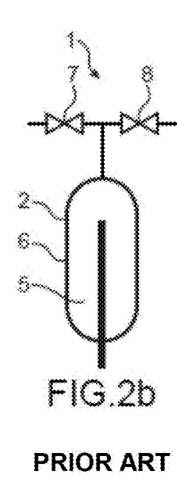
Figure 2C:
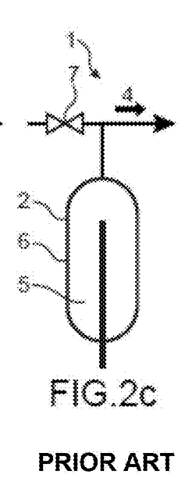

The storage element 5 is then heated to a temperature of between 30° and 240° C. The result is a desorption of the hydrogen stored by the storage element 5 during the first step, and therefore an increase in the hydrogen pressure in the pressure chamber. The higher the temperature imposed on the storage chamber 5, the greater this increase in pressure.

This is because the hydrogen pressure varies according to an exponential temperature law. The hydrogen pressure in the pressure chamber, at the end of the second step, may therefore be between 3 bar and 4350 bar.

The transfer valve 8 is then opened at the start of the third step (FIG. 2c) so as to transfer the hydrogen under high pressure to the reservoir 10, while imposing heating on the storage element 5.

As soon as the pressure chamber is empty, the transfer valve 8 is closed at the start of the fourth step (FIG. 2d) and the storage element 5 is cooled again.

Figure 2D:
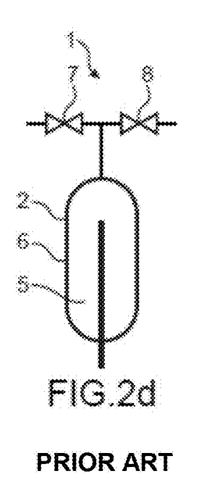

Thus it is possible to fill the hydrogen reservoirs 10 under pressure, in particular hydrogen reservoirs 10 intended for dispensing hydrogen in service stations, or hydrogen reservoirs 10 intended for transporting hydrogen.

We note however that this device is not satisfactory.

This is because the thermal efficiency of the metal hydride hydrogen compressor 1 known from the prior art is not optimal.

More particularly, some of the quantity of heat supplied by the heat exchange means 6 is also used to heat the pressure chamber.

One aim of the present invention is then to propose a metal hydride hydrogen compressor having better efficiency than the metal hydride hydrogen compressors known from the prior art.

Another aim of the invention is also to propose a metal hydride hydrogen compressor making it possible to achieve high hydrogen pressures, for example pressures above 100 bar.

DISCLOSURE OF THE INVENTION

The aims of the present invention are, at least partly, achieved by a metal hydride hydrogen compressor comprising:
- a pressure chamber, comprising an internal volume, delimited by a first internal surface,
- a casing with a thickness E, the casing comprising a first external surface opposite the first internal surface, the casing comprising an insulating material with a first thermal conductivity,
- a hydrogen storage element, contained in the casing, comprising a storage material suitable for storing or releasing hydrogen according to a temperature that is imposed thereon, and having a second thermal conductivity greater than the first thermal conductivity.

The casing makes it possible to thermally insulate the pressure chamber from the storage element and thus to limit the heat exchanges between these two elements.

It is therefore possible to compress hydrogen at pressures above 100 bar while limiting the losses due to dissipation of the heat by the pressure chamber.

According to one embodiment, the hydrogen compressor comprises arrangements allowing a circulation of hydrogen between the first internal surface and the first external surface.

According to one embodiment, the arrangements comprise an annular space disposed between the first internal surface and the first external surface, and/or channels formed on at least one of the first internal surface and the first external surface.

According to one embodiment, the casing further comprises means suitable for providing a passage of hydrogen through the thickness E of the casing.

According to one embodiment, the casing comprises an open porosity allowing the passage of hydrogen through the thickness E of said casing.

According to one embodiment, the casing comprises at least one piercing allowing the passage of hydrogen through the thickness E of said casing, advantageously the casing also comprises a filter cooperating with the at least one piercing so as to confine the storage element in the casing.

According to one embodiment, the thickness E of the casing is between 1 mm and 20 mm.

According to one embodiment, the casing comprises at least one of the materials chosen from: PTFE, a polyamide, a polyurethane, a polyethylene, polypropylene and PEEK.

According to one embodiment, the first thermal conductivity is less than 0.3 W/m/K.

According to one embodiment, the hydrogen compressor further comprises a heat exchange means able to provide an exchange of heat directly with the storage element, advantageously the heat exchange means comprises a tube through which a heat-transfer fluid travels.

According to one embodiment, the heat exchange means comprises a second external surface made from a material with a third thermal conductivity, said heat exchange means passing through the pressure chamber through a first opening, the compressor further comprises a connection means, comprising an annular-shaped section, said annular-shaped section providing a sealed connection between the heat exchange means and the pressure chamber, and preventing any contact between the heat exchange means and the pressure chamber, the connection means comprising a material with a fourth thermal conductivity lower than one tenth of the third thermal conductivity so as to thermally insulate the heat exchange means from the pressure chamber.

According to one embodiment, the pressure chamber comprises a cylindrical barrel extending along a longitudinal axis, comprising a first end at which the first opening is formed, the annular-shaped connection means being in abutment against a stop formed at the first internal surface, the stop advantageously comprising a shoulder formed at the first internal surface.

According to one embodiment, the connection means is held against the stop by a clamping means, advantageously the clamping means comprises a plug comprising a passage through which the heat exchange means passes.

According to one embodiment, an antifriction washer is interposed between the clamping means and the connection means.

According to one embodiment, the connection means comprises at least one material chosen from: an elastomer, a ceramic, stainless steel or a nickel alloy.

According to one embodiment, the connection means is also provided with first seals providing the sealed connection between the pressure chamber and the heat exchange means.

According to one embodiment, the heat exchange means also passes through the pressure chamber through a second opening, second seals providing the seal between the heat exchange means and the pressure chamber at the second opening.

BRIEF DESCRIPTION OF THE DRAWINGS

Other features and advantages will emerge from the following description of embodiments of the metal hydride hydrogen compressor according to the invention, given by way of non-limitative examples with reference to the accompanying drawings, in which:

FIGS. 4a and 4b show a cross section of a hydrogen compressor extending along a longitudinal axis X, and more particularly FIG. 4a is a schematic representation of an annular space disposed between the first internal surface and the first external surface, while

DETAILED DISCLOSURE OF PARTICULAR EMBODIMENTS

The invention described in detail below uses a metal hydride hydrogen compressor in which the storage element and the heat exchange means can be thermally insulated from the pressure chamber in order to improve the efficacy of the compressor according to the invention.

Figure 3A:
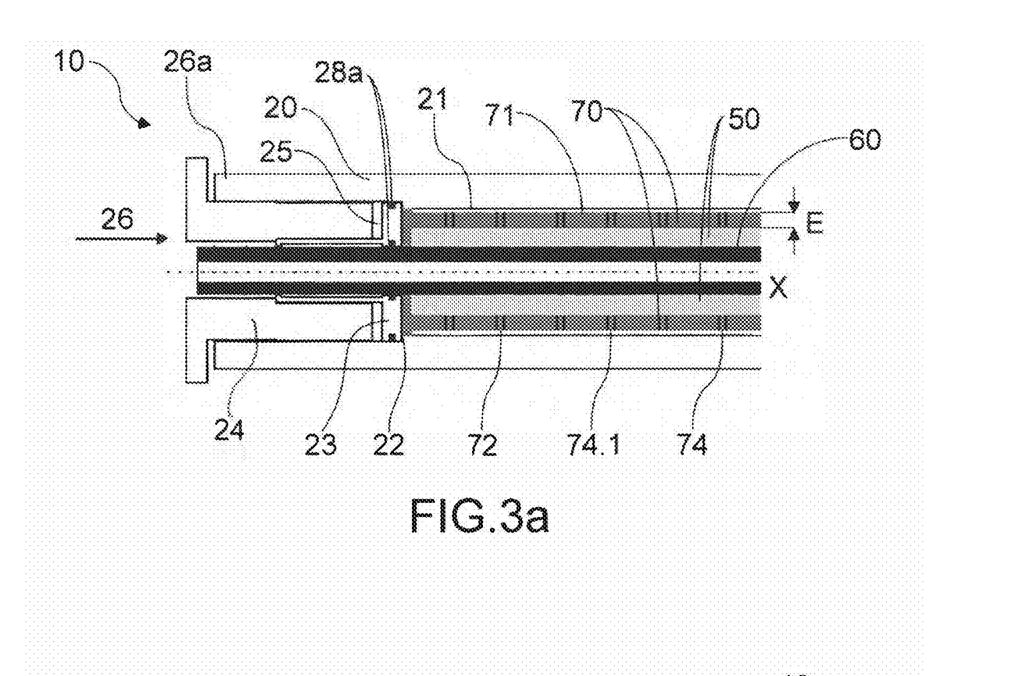
FIGS. 3a and 3b are respective schematic representations at a first end and a second end and in a cross section comprising the longitudinal axis X of the metal hydride hydrogen compressor according to one embodiment of the invention.
Figure 3B:
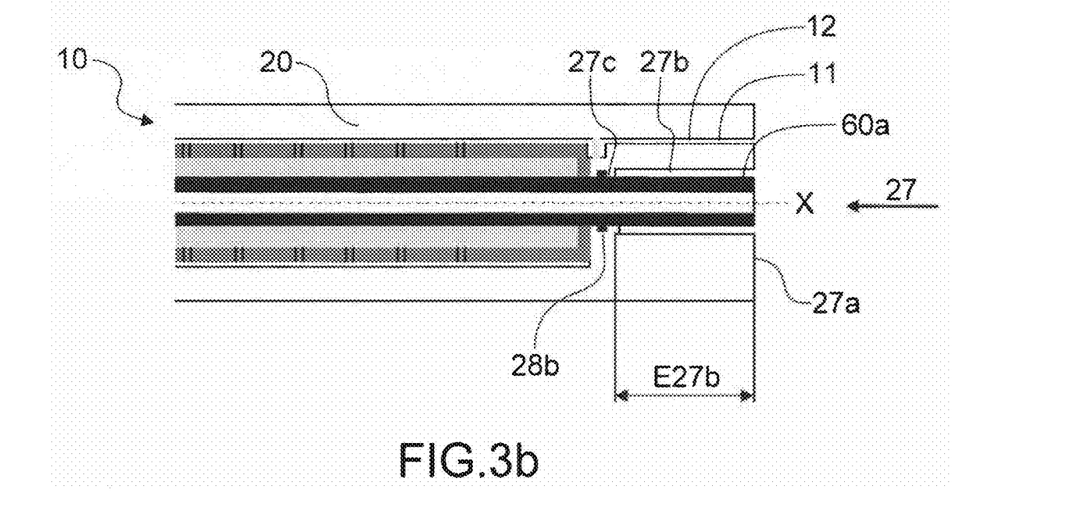

In FIGS. 3a and 3b, an example embodiment of a metal hydride hydrogen compressor 10 according to the present invention can be seen.

The hydrogen compressor 10 according to the invention comprises a pressure chamber 20 comprising an internal volume delimited by a first internal surface 21.

Pressure chamber 20 is intended to mean a container suitable for withstanding high pressures, more particularly pressures above 100 bar.

The pressure chamber 20 has a thickness conferring thereon sufficient mechanical strength to withstand the pressures that are imposed thereon (thickness of the pressure chamber means the thickness of the wall thereof).

A person skilled in the art, with his general knowledge, can without any problem determine the thickness of the pressure chamber most suited to the application sought. By way of example, a pressure chamber 20 can have a cylindrical shape and have a thickness of between one tenth and twice the internal radius thereof. Internal radius means the smallest radius of the two cylindrical surfaces forming the pressure chamber 20.

The pressure chamber 20 may comprise at least one of the materials chosen from: stainless steel, carbon steel, nickel-based alloy, or alloy based on titanium, aluminium or copper.

The metal hydride hydrogen compressor 10 can be supplied, via a supply pipe 11, by a low-pressure hydrogen source.

The hydrogen compressor 10 can also be connected, via a transfer pipe 12, to a reservoir (a storage reservoir for example).

As shown in FIG. 3b, the supply pipe 11 and the transfer pipe 12 are one and the same pipe.

The hydrogen compressor 10 also comprises a casing 70 with a thickness E. The casing 70 comprises a first external surface 71 opposite the first internal surface 21. The casing 70 comprises an insulating material with a first thermal conductivity.

For example, the casing 70 may comprise at least one of the materials chosen from: PTFE (polytetrafluoroethylene), a polyamide, a polyurethane, a polyethylene, a polypropylene or PEEK (polyetheretherketone).

The first thermal conductivity may be less than 0.3 W/m/K.

The hydrogen compressor also comprises a hydrogen storage element 50, contained in the casing 70. Thus the casing 70 prevents any contact between the storage element 50 and the pressure chamber 20.

The storage element 50 comprises a storage material suitable for storing or releasing hydrogen according to a temperature that is imposed thereon. For example, the storage material can absorb hydrogen when it is cooled, and desorb said hydrogen when it is heated.

For example, the storage material may comprise at least one of the materials chosen from: alloys of type AB, AB2, AB5 or BCC, for example the families FeTi, TiMn$_2$, LaNi$_5$ or TiVCr, or a combination of these types of alloys with the substitution or addition of other elements for adjusting the thermodynamic properties of the storage material to the operating conditions of the compressor.

The storage material may be in powder form, compacted or sintered.

Advantageously, the storage material has a second thermal conductivity greater than the first thermal conductivity, conferring on the casing 70 a function of thermal insulator.

Figure 4A:
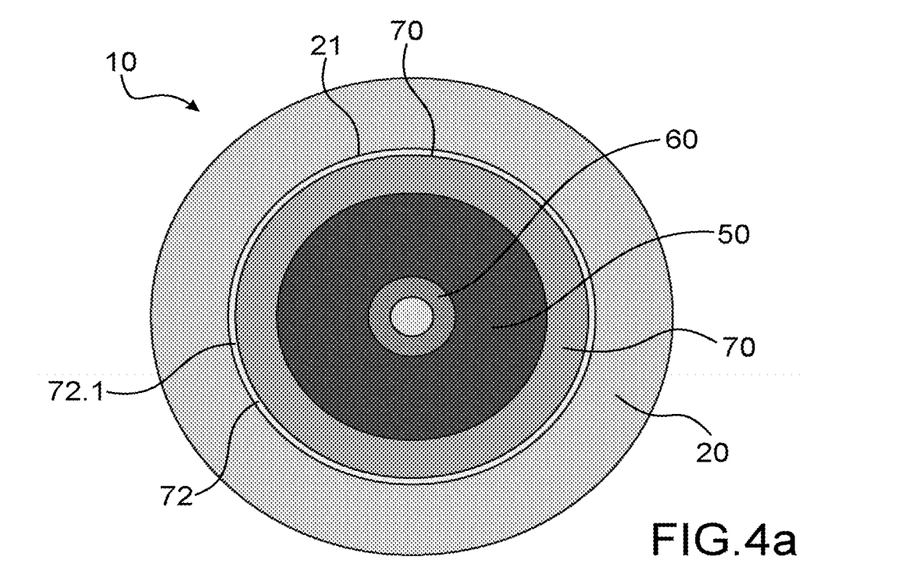
Figure 4B:
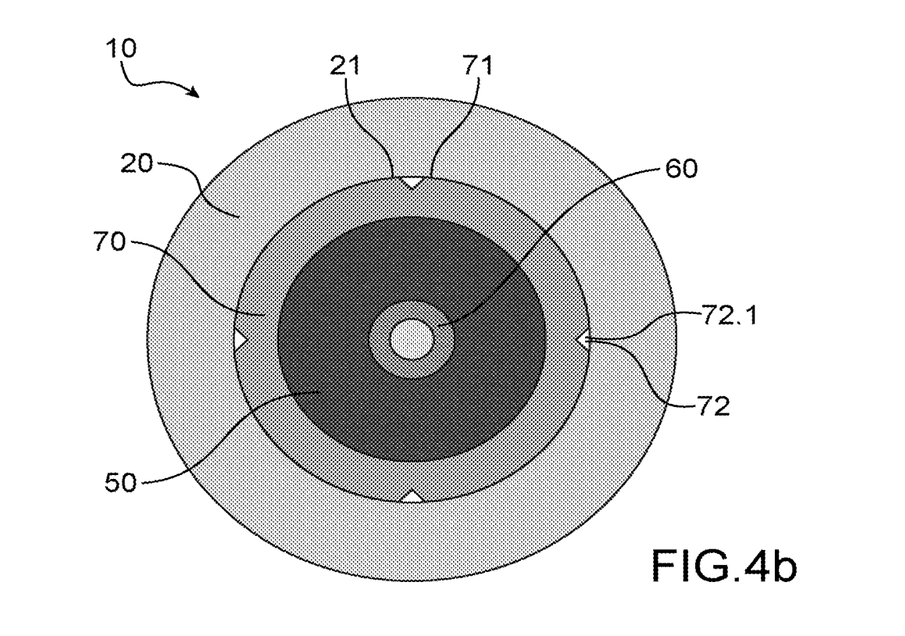
FIG. 4b is a schematic representation of channels formed on the first external surface, according to one embodiment of the invention.

The hydrogen compressor 10 can comprise arrangements 72 allowing a circulation of hydrogen between the first internal surface 21 and the first external surface 71. For example, the arrangement 72 may comprise an annular space 72.1 disposed between the first internal surface 21 and the first external surface 71. In an alternative or complementary manner, the arrangements may comprise channels 72.1 formed on at least one of the first internal surface 21 and first external surface 71.

By way of example, FIGS. 4a and 4b show a cross section of a hydrogen compressor 10 extending along a longitudinal axis X. Cross section means a cross section in a plane perpendicular to the longitudinal axis X. More particularly, FIG. 4a is a schematic representation of an annular space 72.1 disposed between the first internal surface 21 and the first external surface 71, while FIG. 4b is a schematic representation of channels 72.2 formed on the first external surface 71 (the case where the channels 72.2 are formed on the first internal surface 21 is not shown).

The annular space 72.1 may have a thickness less than 10% of the radius of a cylindrical volume occupied by the storage element 50.

The casing 70 may also comprise means suitable for providing a hydrogen passage 74 through the thickness E of the casing 70.

According to a first particular embodiment of the means suitable for providing a hydrogen passage 74, the casing 70 may comprise an open porosity allowing the passage of hydrogen through the thickness E of said casing 70 (in contradistinction to a closed porosity, an open porosity means an absence of closed cavities in the casing 70). The open porosity of the casing 70 can also fulfil the role of filter making it possible to confine the storage material when the latter is in powder form.

An open porosity can be obtained with a sintered material or one in the form of a foam. The techniques for shaping the material forming the casing 70 are known to persons skilled in the art and are therefore not described in detail in the present invention.

According to a second particular embodiment of the means suitable for providing a hydrogen passage 74, the casing 70 may comprise at least one piercing 74.1 allowing the passage of hydrogen through the thickness E of said casing 70.

The piercing 74.1 can advantageously be provided with a filter allowing a passage of hydrogen, but confining the storage material when the latter is in powder form.

We note that the first and second particular embodiments of the means able to provide a hydrogen passage 74 can be considered independently of one another or taken in combination.

Advantageously, the applicant has remarked that a thickness E of the casing 70 lying between 1 mm and 20 mm can afford suitable thermal insulation between the pressure chamber 20 and the storage element 50.

The hydrogen compressor 10 may further comprise a heat exchange means 60 able to provide an exchange of heat directly with the storage element 50.

Providing a direct exchange of heat with the storage element 50 means a heat exchange means 60 in contact with said storage element 50, advantageously the heat exchange means 60 is at least partially included in the volume of the storage element 50.

Advantageously, the heat exchange means 60 may comprise a tube 60 through which a heat-transfer fluid travels, such as water, possibly under pressure, or glycolated water, or an oil.

The tube 60 through which a heat-transfer fluid travels may comprise a mechanically strong material chemically inert with hydrogen, for example the tube 60 may comprise at least one of the materials chosen from: a stainless steel, a beryllium copper alloy, a brass, a nickel alloy or a carbon steel.

The heat exchange means 60 comprises a second external surface 60a made from a material with a third thermal conductivity.

The third thermal conductivity may for example be greater than 10 W/m/K.

The tube 60 may also comprise fins suitable for increasing the heat exchange surface area with the storage element 50, and also for allowing better homogeneity of the temperature in said storage element 50. Advantageously, the fins extend radially to the tube.

Figure 5:
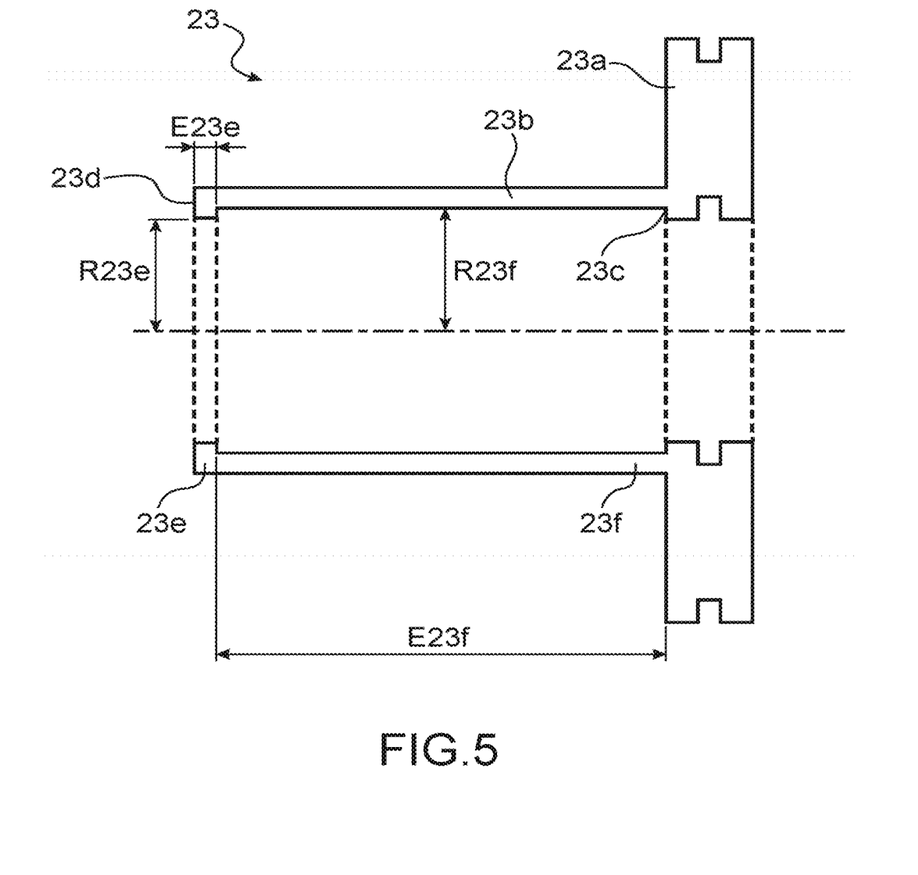
FIG. 5 is a representation in cross section of the connection means according to one embodiment of the invention.

The heat exchange means 60 passes through the pressure chamber 20 through a first opening 26. A connection means 23 provides a sealed connection between the heat exchange means 60 and the pressure chamber 20. More particularly, the heat exchange means 60 comprises a section with an annular shape 23a internal radius of between 2 mm and 100 mm, and an external radius of between 6 mm and 110 mm) interposed between the heat exchange means 60 and the pressure chamber 20 (FIG. 5). The connection means 23 comprises a material with a fourth thermal conductivity less than one tenth of the third thermal conductivity so as to thermally insulate the heat exchange means 60 from the pressure chamber 20.

The connection means 23 can also be provided with first seals 28a, for example first seals 28a with a toric shape and made from elastomer.

The connection means 23 may comprise at least one of the materials chosen from: a polymer, a ceramic, a steel, a stainless steel and a nickel alloy.

According to a particular embodiment of the invention, the pressure chamber may comprise a cylindrical barrel extending along a longitudinal axis X.

The barrel comprises a first end 26a at which the first opening 26 is formed. The barrel also comprises a second end 27a opposite to the first end 26a along the longitudinal axis X.

The thickness of the barrel may be between one tenth and twice the internal radius thereof.

The annular-shaped section 23a of the connection means 23 is in abutment against a stop 22 formed at the first internal surface 21.

For example, the stop 22 is formed by a shoulder on the first internal surface 21.

The connection means 23 is held against the stop 22 by a clamping means 24, advantageously the clamping means 24 comprises a plug comprising a passage through which the heat exchange means 26 passes.

The plug 24 can be screwed to the first internal surface 21. The latter provides a mechanical locking of the connection means 23 against the stop 22. Moreover, the plug 24 is designed so as to withstand the pressure imposed by the pressurised hydrogen in the pressure chamber 20.

The hydrogen compressor 10 may also comprise an antifriction washer 25 (washer means an annular-shaped element), interposed between the plug 24 and the connection means 23. More particularly, the antifriction washer 25 is suitable for thermally insulating the connection means 23 from the plug 24. The antifriction washer 25 may for example comprise a polymer material.

The connection means 23 may also comprise a guide means 23b intended to prevent buttressing of the tube 60 when inserted in the pressure chamber 20. The guide means 23b may be a cylinder comprising an end 23c connected to the annular-shaped section 23a, and a free end 23d. Advantageously the guide means 23b in the form of a cylinder has a first cylindrical section 23e with an internal radius R23e equal to the radius of the tube 60, and a second cylindrical section 23f in contact with the annular-shaped section 23a, with an internal radius R23f greater than the radius of the tube 60. Thus the guide means 23b is in contact with the tube 60 only at the first cylindrical section 23e. Advantageously, the second cylindrical section 23f extends over a length E23f at least equal to the radius of the tube 60. The first cylindrical section 23e can extend over a length E23e of between 0.1 mm and 11 mm.

Advantageously, the heat exchange means 60 may also pass through the pressure chamber 20 at a second opening 27 in a sealed manner. One or more second seals 23b may be interposed between the pressure chamber 20 and the heat exchange means 60.

The second opening 27 may correspond to a piercing formed as from the second end 27a. Said piercing may comprise a first cylindrical surface 27b and a second cylindrical surface 27c juxtaposed. The first cylindrical surface 27b is facing a section of the second external surface 60a of the heat exchange means 60, and extends along the longitudinal axis X, from the second end over a length E27b. The diameter of the first cylindrical surface 27b is greater than the diameter of the heat exchange means 60 so that there is no contact between the second internal surface 60a and the first cylindrical surface 27b (for example a cylindrical layer of air with a thickness of between 0.1 mm and 10 mm can thus be observed).

The second cylindrical surface 27c is in contact with the second external surface 60a over a length E27c in the direction of the longitudinal axis X. The second seal 28b can be interposed between the second external surface 60a and the second cylindrical surface.

REFERENCES

[1] WO 2012/114229

The invention claimed is:

1. A metal hydride hydrogen compressor comprising:
   a pressure chamber, comprising an internal volume, delimited by a first internal surface, wherein the pressure chamber extends along a longitudinal axis of the compressor,
   a casing with a thickness E, the casing comprising a first external surface opposite the first internal surface, the casing comprising an insulating material with a first thermal conductivity, and
   a hydrogen storage element, contained in the casing, comprising a storage material suitable for storing or releasing hydrogen according to a temperature that is imposed thereon, and having a second thermal conductivity greater than the first thermal conductivity,
   wherein a region of the first internal surface of the pressure chamber is in contact with a region of the first external surface of the casing, and
   the hydrogen compressor further comprising, between the pressure chamber and the casing, channels extending along the longitudinal axis and allowing a circulation of hydrogen between a zone of the first internal surface and a zone of the first external surface.

2. The compressor according to claim 1, wherein the casing further comprises a passage adapted for hydrogen passing through the thickness E of the casing.

3. The compressor according to claim 2, wherein the casing comprises an open porosity, as the passage, allowing the passage of hydrogen through the thickness E of said casing.

4. The compressor according to claim 2, wherein the casing comprises at least one piercing, as the passage, allowing the passage of hydrogen through the thickness E of said casing.

5. The compressor according to claim 1, wherein the thickness E of the casing is from 1 mm to 20 mm.

6. The compressor according to claim 1, wherein the casing comprises at least one of the materials selected from the group consisting of PTFE, a polyamide, a polyurethane, a polyethylene, PEEK and polypropylene.

7. The compressor according to claim 1, wherein the hydrogen compressor further comprises a heat exchanger able to provide an exchange of heat directly with the storage element.

8. The compressor according to claim 7, wherein the heat exchanger comprises a second external surface made from a material with a third thermal conductivity, a heat-transfer fluid passes the heat exchanger through the pressure chamber through a first opening, the compressor further comprises a connector comprising an annular-shaped section, the annular-shaped section providing a sealed connection between the heat exchanger and the pressure chamber, and preventing a contact between the heat exchanger and the pressure chamber, the connector comprising a material with a fourth thermal conductivity lower than one tenth of the third thermal conductivity so as to thermally insulate the heat exchanger from the pressure chamber.

9. The compressor according to claim 8, wherein the pressure chamber comprises a cylindrical barrel extending along the longitudinal axis, comprising a first end at which the first opening is formed, the annular-shaped section of the connector being in abutment against a stop formed at the first internal surface, the stop comprising a shoulder formed at the first internal surface.

10. The compressor according to claim 9, wherein the connector is held against the stop by a clamping plug comprising a passage through which the heat exchanger fluid passes.

11. The compressor according to claim 10, wherein an antifriction washer is interposed between the clamping plug and the connector.

12. The compressor according to claim 9, wherein the connector is provided with first seals providing a sealed connection between the pressure chamber and the heat exchanger.

13. The compressor according to claim 9, wherein the heat exchanger fluid passes through the pressure chamber through a second opening, wherein the compressor comprises second seals providing a seal between the heat exchanger and the pressure chamber at the second opening.

14. A metal hydride hydrogen compressor comprising:
- a pressure chamber, comprising an internal volume, delimited by a first internal surface,
- a casing with a thickness E, the casing comprising a first external surface opposite the first internal surface, the casing comprising an insulating material with a first thermal conductivity, and
- a hydrogen storage element, contained in the casing, comprising a storage material suitable for storing or releasing hydrogen according to a temperature that is imposed thereon, and having a second thermal conductivity greater than the first thermal conductivity,
wherein the casing comprises at least one piercing, as a passage, allowing the passage of hydrogen through the thickness E of said casing.

15. A metal hydride hydrogen compressor comprising:
- a pressure chamber, comprising an internal volume, delimited by a first internal surface,
- a casing with a thickness E, the casing comprising a first external surface opposite the first internal surface, the casing comprising an insulating material with a first thermal conductivity,
- a hydrogen storage element, contained in the casing, comprising a storage material suitable for storing or releasing hydrogen according to a temperature that is imposed thereon, and having a second thermal conductivity greater than the first thermal conductivity, and
- a heat exchanger able to provide an exchange of heat directly with the storage element,
wherein the heat exchanger comprises a second external surface made from a material with a third thermal conductivity, a heat-transfer fluid passes the heat exchanger through the pressure chamber through a first opening, the compressor further comprises a connector comprising an annular-shaped section, the annular-shaped section providing a sealed connection between the heat exchanger and the pressure chamber, and preventing a contact between the heat exchanger and the pressure chamber, the connector comprising a material with a fourth thermal conductivity lower than one tenth of the third thermal conductivity so as to thermally insulate the heat exchanger from the pressure chamber.

* * * * *